(12) United States Patent
Nickel

(10) Patent No.: US 10,576,906 B2
(45) Date of Patent: Mar. 3, 2020

(54) CAMERA ARRANGEMENT

(71) Applicant: WITTE Automotive GmbH, Velbert (DE)

(72) Inventor: Andreas Nickel, Sprockhovel (DE)

(73) Assignee: WITTE Automotive GmbH, Velbert (DE)

( * ) Notice: Subject to any disclaimer, the term of this patent is extended or adjusted under 35 U.S.C. 154(b) by 933 days.

(21) Appl. No.: 15/003,194

(22) Filed: Jan. 21, 2016

(65) Prior Publication Data
US 2016/0219204 A1 Jul. 28, 2016

(30) Foreign Application Priority Data
Jan. 23, 2015 (DE) .................. 10 2015 101 007

(51) Int. Cl.
*H04N 5/225* (2006.01)
*B60R 11/04* (2006.01)
*B60R 11/00* (2006.01)

(52) U.S. Cl.
CPC .......... *B60R 11/04* (2013.01); *H04N 5/2251* (2013.01); *B60R 2011/0082* (2013.01); *B60R 2011/0092* (2013.01)

(58) Field of Classification Search
CPC ............ B60R 11/04; B60R 2011/0082; H04N 5/2251
See application file for complete search history.

(56) References Cited

U.S. PATENT DOCUMENTS

| 8,243,137 | B2 | 8/2012 | Schuetz | |
|---|---|---|---|---|
| 2009/0309971 | A1* | 12/2009 | Schuetz | B60R 11/04 348/148 |
| 2014/0197649 | A1* | 7/2014 | Hansen | B60R 11/04 292/336.3 |

FOREIGN PATENT DOCUMENTS

| DE | 10204764 A1 | 8/2003 |
|---|---|---|
| DE | 10234483 A1 | 2/2004 |
| DE | 102004050297 A1 | 4/2006 |
| DE | 202006002912 U1 | 6/2006 |
| DE | 202005017430 U1 | 9/2006 |
| DE | 102006039192 A1 | 2/2008 |
| DE | 102007053117 A1 | 5/2009 |
| DE | 102008010966 A1 | 8/2009 |
| DE | 102009008281 A1 | 8/2010 |
| DE | 102010007850 A1 | 9/2010 |
| DE | 102010008214 A1 | 9/2010 |
| DE | 102010013171 A1 | 12/2010 |
| DE | 102010051936 A1 | 6/2011 |
| DE | 102010001108 A1 | 7/2011 |
| DE | 102010001196 A1 | 7/2011 |

(Continued)

*Primary Examiner* — Mainul Hasan
(74) *Attorney, Agent, or Firm* — Wiggin and Dana LLP; Gregory S. Rosenblatt

(57) ABSTRACT

The invention relates to a camera arrangement for a vehicle having a camera unit and a pivot mechanism for the pivoting of the camera unit into an active position and into a position of rest. The camera unit is accommodated in a chamber in an inaccessible manner from the outside in the position of rest and is pivoted out of the chamber in the active position for the optical detection of a surrounding zone. The pivot mechanism comprises two pivot arms which are rotatably coupled to the camera unit at oppositely disposed sides thereof and which pivot in opposite directions during the pivoting of the camera unit.

23 Claims, 1 Drawing Sheet

(56) References Cited

FOREIGN PATENT DOCUMENTS

| | | |
|---|---|---|
| DE | 102011017239 A1 | 12/2011 |
| DE | 102011017240 A1 | 12/2011 |
| DE | 102010045214 A1 | 3/2012 |
| DE | 102010060573 A1 | 5/2012 |
| DE | 102011050471 A1 | 11/2012 |
| DE | 102011111854 A1 | 2/2013 |
| DE | 102013014939 A1 | 3/2014 |
| DE | 102012025626 A1 | 4/2014 |
| DE | 102012109609 A1 | 4/2014 |
| DE | 102012109610 A1 | 4/2014 |
| DE | 102012109611 A1 | 4/2014 |
| DE | 102013111224 A1 | 4/2014 |
| DE | 102013020664 A1 | 8/2014 |
| EP | 1648737 B1 | 11/2006 |
| EP | 1529688 B1 | 2/2007 |
| EP | 1332923 B1 | 7/2007 |
| EP | 2523830 A1 | 11/2012 |
| EP | 2523930 A1 | 11/2012 |
| EP | 2058178 A3 | 7/2014 |
| EP | 2796324 A1 | 10/2014 |
| KR | 20130134312 A | 12/2013 |
| KR | 20130134313 A | 12/2013 |
| WO | 2011120623 A1 | 10/2011 |

\* cited by examiner

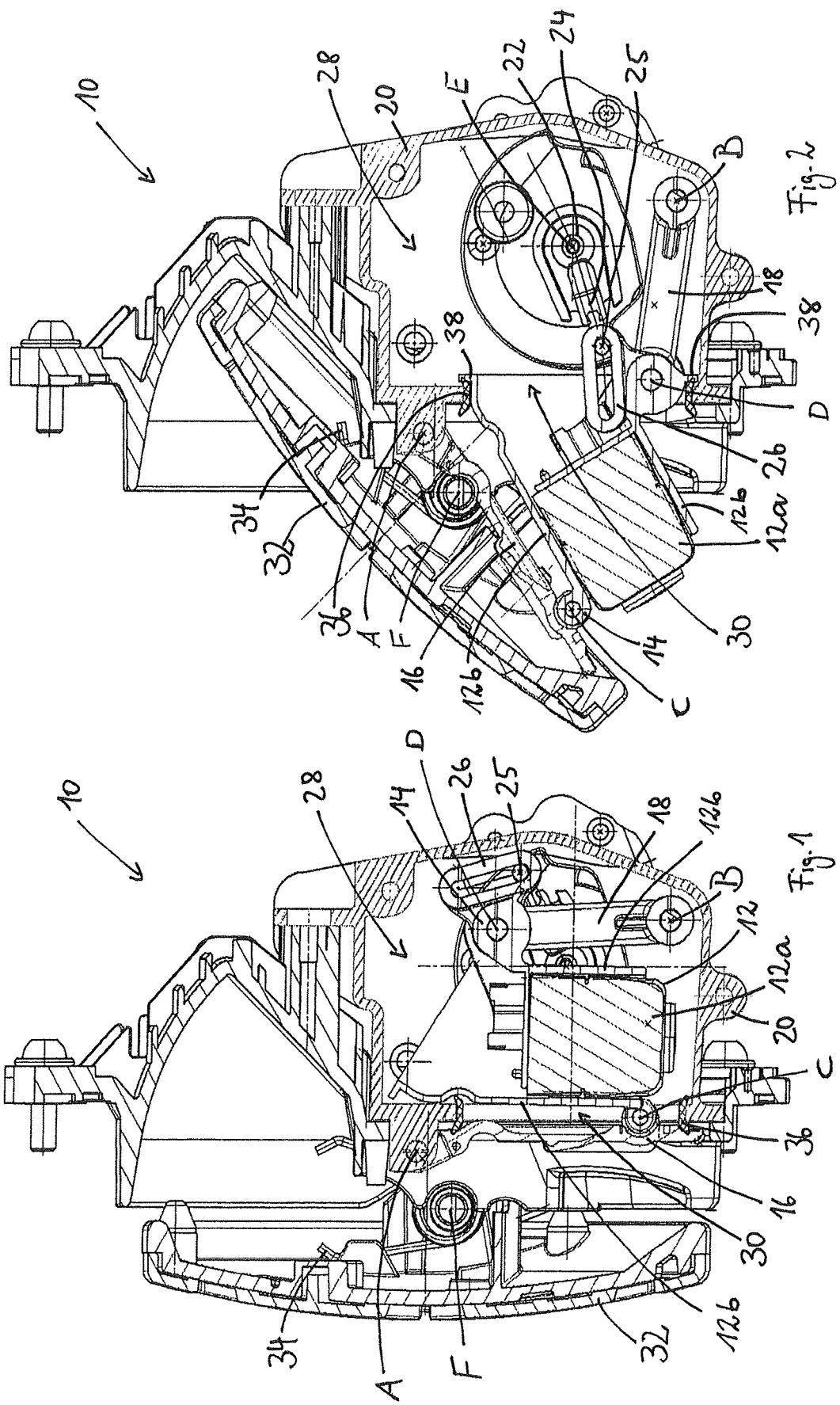

CAMERA ARRANGEMENT

The present invention relates to a camera arrangement for a vehicle having a camera unit and a pivot mechanism for pivoting the camera unit. The camera unit is accommodated in a chamber in an inaccessible manner from the outside in a position of rest and is pivoted out of the chamber in an active position for the optical detection of a surrounding zone. A camera arrangement of the initially named kind is suitable, for example, as a so-called rear view camera which is configured for the detection of an exterior zone behind the vehicle.

So-called rear view cameras which are able to detect a rear external zone of the vehicle and, for example, to present it on a display in the dashboard of the vehicle are above all provided in modern motor vehicles, e.g. in passenger vehicles or trucks, to facilitate reversing and/or to support driver assistance systems. The camera can be attached to a rear side of the vehicle such that it is able to record a zone behind the vehicle in the active position. For the protection of the camera, it is accommodated in the chamber in the position of rest, i.e. at a time at which the camera is not activated.

Known camera arrangements of this kind have the disadvantage that they require a comparatively large amount of construction space.

It is therefore the underlying object of the invention to provide a more compact camera arrangement.

The object is satisfied by a camera arrangement in accordance with claim 1 and in particular in that the pivot mechanism comprises two pivot arms which are rotatably coupled to the camera unit at oppositely disposed sides thereof and which pivot in opposite directions of rotation during the pivoting of the camera unit.

In other words, the pivot arms are coupled to the camera unit such that the coupling position between the first pivot arm and the camera unit and the coupling position between the second pivot arm and the camera unit are located at opposite sides of the camera unit. This allows particularly space-saving kinematics for the pivoting of the camera unit from the position of rest into the active position and back.

Advantageous embodiments can be found in the dependent claims, in the description and in the drawings.

In accordance with an embodiment, the pivot arms of the pivot mechanism are rotatably coupled to the camera unit at diagonally oppositely disposed corner regions thereof. In this manner, with a simultaneously compact construction space, longer pivot arms can be realized which in turn allow a greater freedom of movement of the camera unit.

The camera unit can be supported and guided only by the two pivot arms. No additional guide, for example a slot guide, is thus required for the camera unit. This simplifies the assembly of the camera arrangement and furthermore contributes to an even more compact construction space.

At least one of the pivot arms can be rotatably supported at a chamber housing defining the chamber. Both pivot arms are preferably rotatably supported at the chamber housing.

To obtain a particularly torsionally rigid pivot mechanism, at least one of the pivot arms can substantially have the width of the camera unit. Width here means the dimension along the pivot axis disposed between the pivot arm and the camera unit. The pivot arm can in this respect e.g. be rotatably coupled to a shaft pin of the camera unit at two support points spaced apart from one another along the pivot axis.

The pivot arms can be produced in one piece, for example by a casting process, and can in particular comprise a plastic material.

In accordance with an embodiment, the pivot mechanism comprises a drive mechanism whose drive force engages at one of the pivot arms or at the camera unit to actuate the pivot mechanism. The drive force preferably engages at a region of the pivot arm remote from the support of the pivot arm at the vehicle structure. This has the advantage that less force is required to actuate the pivot mechanism since the length between the support of the pivot arm at the vehicle structure and the point of engagement of the drive force acts as a lever arm. It is furthermore also conceivable that the drive force engages directly at the camera unit.

The drive mechanism can comprise a crank and a drive motor for pivoting the crank about an axis of rotation, with a section of the crank spaced apart from the axis of rotation being rotatably coupled to the pivot arm or to the camera unit. A purely rotational movement of the drive motor can hereby be simply converted into a drive force for the actuation of the pivot mechanism.

In this respect, the crank section coupled to the pivot arm or to the camera unit can be guided in a slot guide formed at the pivot arm or at the camera unit. The pivot mechanism can hereby be actuated in both pivot directions, i.e. from the position of rest into the active position and back.

In accordance with an embodiment, the camera unit is arranged behind a rotatably supported cover in the position of rest. The cover can satisfy a multiple function in that it provides an appealing external appearance of the camera arrangement and, for example, carries an emblem, e.g. of the vehicle manufacturer, in that it contributes to a protection of the camera unit from external influences such as moisture, salt or dust and/or in that it forms an actuation element for actuating a lock, e.g. of a tailgate or of a trunk cover of the vehicle.

To open the cover, one of the pivot arms can press the cove open into an open position on the pivoting into the active position, preferably against the restoring force of a return spring acting on the cover. The cover is hereby automatically opened or closed on the actuation of the pivot mechanism.

The pivot open pressing the cover open is advantageously supported independently of the cover. This means that the pivot arm and the cover represent two separate components which can, for example, each be supported at the housing and are not connected to one another. A pivot axis of the pivot arm pressing the cover open is preferably spaced apart from an axis of rotation of the cover. This has the advantage that a pivot angle of the pivot arm can differ from an pivot angle of the cover.

One of the pivot arms, in particular a pivot arm pressing a cover open, can be configured as a flap which closes the opening of the chamber in the position of rest of the camera unit, through which opening the camera unit moves on its pivoting into the active position. The pivot arm hereby satisfies a dual function. On the one hand, it guides and supports the camera unit during the pivoting from the position of rest into the active position; on the other hand, it closes the opening in the position of rest to protect the camera unit.

The opening of the chamber is preferably closed by the camera unit when the camera unit adapts its active position. The camera unit thus also satisfies a dual function in that it not only serves for the image detection, but also for the sealing.

The chamber is in this manner nevertheless effective against external influences such as moisture, salt or dust in the active position in which the flap is flipped open and an additional sealing device can be dispensed with.

In accordance with an embodiment, a peripheral seal is provided in the marginal region of the opening which seals against the flap in the position of rest and which seals against the camera unit in the active position. This has the advantage that the chamber is sealed both in the position of rest and in the active position with the help of a single simple seal.

A further subject of the invention is a camera arrangement in accordance with claim 19 which is in particular characterized in that a peripheral seal is provided in the marginal region of the opening which seals against a flap in the position of rest and which seals against the camera unit in the active position. The use of a single seal for the sealing of the opening in the position of rest and in the active position represents a particularly simple and space-saving sealing concept.

The seal can have two active surfaces, with the flap contacting the first active surface in the position of rest and with the camera unit contacting the second active surface in the active position. The two active surfaces are preferably disposed at opposite sides of the seal. This simplifies the construction since the flap and the camera unit can come into contact with the seal from different directions.

The seal can comprise two sealing lips which are arranged substantially opposite one another and of which each has an active surface. Active surface hear means that surface of the seal which comes into contact with a second part, for example with the flap or with the camera unit, to generate a sealing effect at the contact point.

The seal can comprise one or more components which are connected to one another with material continuity.

The seal preferably forms an abutment against which the camera unit abuts in the active position. It is hereby ensured that a sufficiently high surface pressure is generated between the seal and the camera unit to achieve a desired sealing effect. In addition, the movement of the camera unit into the active position is limited by the seal so that the camera unit always adopts a defined end position in its active position.

The flap can be pivotably coupled to a housing forming the opening and defining the chamber. A closing and sealing of the opening can hereby be effected in a simple manner.

The flap can furthermore be rotatably connected to the camera unit. This has the advantage that the flap is co-moved with particularly small resistance on a pivoting of the camera unit.

The flap is preferably part of a pivot mechanism for the pivoting of the camera unit such as was previously described since the named advantages can hereby be correspondingly achieved.

The invention will be described in the following with reference to a purely exemplary embodiment and to the enclosed drawings. There are shown:

FIG. 1 a sectional representation of a camera arrangement in accordance with the invention in a position of rest; and FIG. 2 a sectional representation of the camera arrangement in an active position.

A camera arrangement 10 is shown in the Figures which has a camera unit 12 and a pivot mechanism 14 for the camera unit 12. The camera unit 12 comprises a camera 12*a* and a camera holder 12*b* carrying the camera 12*a*.

The camera unit 12 can be pivoted from a position of rest (FIG. 1) into an active position (FIG. 2) with the aid of the pivot mechanism 14. For this purpose, the pivot mechanism 14 comprises a first pivot arm 16 and a second pivot arm 18 which are each rotatably coupled to a housing 20 of the camera arrangement 10 in the region of a first end. The first pivot arm 16 is pivotable in this manner about a pivot axis A and the second pivot arm 18 about a pivot axis B relative to the housing 20.

The first pivot arm 16 is rotatably connected in an articulated manner in the region of a second end to a front region of an upper side of the camera unit 12 so that the first pivot arm 16 and the camera unit 12 can pivot relative to one another about a pivot axis C.

The second pivot arm 18 is rotatably connected in an articulated manner in the region of a second end to a rear region of a lower side of the camera unit 12 so that the second pivot arm 18 and the camera unit 12 can pivot relative to one another about a pivot axis D.

The pivot arms 16, 18 are specifically connected to the camera unit 12 in diagonally oppositely disposed corner regions of the camera holder 12*b*. In this respect, the camera unit 12 is aligned substantially vertically in its position of rest (FIG. 1) so that the first pivot arm 16 extends substantially from top to bottom and the second pivot arm 18 extends substantially from bottom to top in the position of rest (FIG. 1).

The camera arrangement 10 furthermore comprises a drive motor 22 which is connected to a crank 24. The drive motor 22 is configured to exert a drive torque onto the crank 24, whereby the crank 24 carries out a rotational movement about an axis of rotation E. A section 25 of the crank 24 spaced apart from its axis of rotation E engages into a slot guide 26 which is formed at the second pivot arm 18, and indeed in an end region which is remote from the pivot axis B of the second pivot arm 18. In the present embodiment, the slot guide 26 is formed in the region of the connection of the second pivot arm 18 to the camera unit 12.

The pivot mechanism 14 and the camera unit 12 are located within a chamber 28, which is defined by the housing 20, in the position of rest. An opening through which the camera unit 12 projects in the active position (FIG. 2) for the optical detection of a surrounding zone is located at a front side of the chamber 28.

The first pivot arm 16 is configured in the manner of a flap which closes the opening 30 in the position of rest and which protects the chamber 28 and consequently the camera unit 12 from external influences such as moisture, salt or dust in the position of rest.

A peripheral seal 36 which extends along a marginal region of the housing 20 defining the opening 30 is provided to increase the sealing effect. The seal 36 has a slightly U-shaped cross-section and comprises two sealing lips of which the one projects into the chamber 28 and the other projects in the opposite direction out of the chamber 28.

The camera arrangement 10 is additionally covered by a cover 32 which is attached to a bodywork structure in a manner rotatable about an axis of rotation F and which is held in the position of rest with the aid of a return spring 34. The axis of rotation F of the cover 32 extends in parallel with and spaced apart from the axis of rotation A of the flap-shaped first pivot arm 16. The cover 32 and the first pivot arm 16 are arranged and are movable independently of one another.

The pivot mechanism 14 can be actuated by means of the drive motor 22 to move the camera unit 12 from the position of rest (FIG. 1) into the active position (FIG. 2). For this purpose, the drive motor 22 drives the crank 24 in a first direction of rotation about the axis of rotation E, counter-clockwise in the present embodiment. The section 25 of the crank 24 which is spaced apart from the axis of rotation E and which is in engagement with the slot guide 26 of the second pivot arm 18 transmits the drive torque to the second pivot arm 18. The second pivot arm 18 hereby pivots in the first direction of rotation, i.e. counter-clockwise, about its pivot axis B and the camera unit 12 pivots in the direction of the opening 30 and through the opening 30. At the same time, the first pivot arm 16 pivots in a direction of rotation opposed to the first direction of rotation, clockwise here, about its pivot axis A in the direction of the cover 32 until it abuts the cover 32 and opens it against the restoring force of the return spring 34 clockwise about the axis of rotation F into the open position shown in FIG. 2. In the resulting active position, rear end abutments 38 of the camera holder 12*b* abut the seal 36, whereby the opening 30 is closed by the camera unit 12.

The camera unit 12 is exclusively supported and guided by the first pivot arm 16 and the second pivot arm 18 and is moved from the position of rest into the active position by means of the crank 24. To pivot the camera unit 12 back into the position of rest, the drive motor 22 is correspondingly driven in the opposite direction and the pivot mechanism 14 thus moves back. It is alternatively also conceivable to provide a return spring for the pivoting back of the pivot mechanism.

REFERENCE NUMERAL LIST

10 camera arrangement
12 camera unit
12*a* camera
12*b* camera holder
14 pivot mechanism
16 first pivot arm
18 second pivot arm
20 housing
22 drive motor
24 crank
25 crank section
26 slot guide
28 chamber
30 opening
32 cover
34 return spring
36 seal
38 end abutment
A pivot axis
B pivot axis
C pivot axis
D pivot axis
E pivot axis
F axis of rotation

The invention claimed is:

1. A camera arrangement for a vehicle having a camera unit and a pivot mechanism for the pivoting of the camera unit into an active position and into a position of rest, wherein the camera is accommodated in a chamber in an inaccessible manner from the outside in the position of rest and is pivoted out of the chamber in an active position for the optical detection of a surrounding zone, with the pivot mechanism comprising
two pivot arms that are rotatably coupled to the camera unit at oppositely disposed sides of the camera unit and that pivot in opposite directions during the pivoting of the camera unit,
one of the two pivot arms being connected to the camera unit at an upper side of the camera unit in the active position, the other of the two pivot arms being connected to the camera unit at a lower side of the camera unit in the active position, wherein
the upper side and the lower side of the camera unit each being on opposite sides of an optical axis of the camera.

2. The camera arrangement in accordance with claim 1, wherein the pivot arms are rotatably coupled to the camera unit at diagonally oppositely disposed corner regions thereof.

3. The camera arrangement in accordance with claim 1, wherein the camera unit is supported and guided only by the two pivot arms.

4. The camera arrangement in accordance with claim 1, wherein the pivot arms are rotatably supported at a chamber housing defining the chamber.

5. The camera arrangement in accordance with claim 1, wherein the pivot mechanism comprises a drive mechanism whose drive force engages at one of the pivot arms or at the camera unit to actuate the pivot mechanism.

6. The camera arrangement in accordance with claim 5, wherein the drive mechanism comprises a crank and a drive motor for the pivoting of the crank about an axis of rotation, with a section of the crank spaced apart from the axis of rotation being rotatably coupled to one of the pivot arms or to the camera unit.

7. The camera arrangement in accordance with claim 6, wherein the crank section coupled to one of the pivot arms or to the camera unit is guided in a slot guide formed at one of the pivot arms or at the camera unit.

8. The camera arrangement in accordance with claim 1, wherein the camera unit is arranged behind a rotatably supported cover in the position of rest and one of the pivot arms presses the cover open into an open position on the pivoting into the active position.

9. The camera arrangement in accordance with claim 8, wherein the pivot arm pressing the cover open is supported independently of the cover; and/or
wherein a pivot axis of the pivot arm pressing the cover open is spaced apart from an axis of rotation of the cover.

10. The camera arrangement in accordance with claim 1, wherein one of the pivot arms is formed as a flap which closes an opening in the position of the rest of the camera unit, through which opening the camera unit moves into the active position on its pivoting.

11. The camera arrangement in accordance with claim 10, wherein the opening is closed by the camera unit when the camera unit adopts its active position.

12. The camera arrangement in accordance with claim 10, wherein a seal is provided completely around a marginal region of the opening, the seal sealing against the flap in the position of rest and sealing against the camera unit in the active position.

13. A camera arrangement for a vehicle having a camera unit which is pivotable into an active position and into a position of rest, wherein the camera unit is accommodated in a chamber inaccessible from the outside in the position of rest and is pivoted out of the chamber through an opening in the active position for the optical detection of a surrounding zone,
wherein a peripheral seal is provided completely around in a marginal region of the opening,
the same peripheral seal sealing against a flap in the position of rest and sealing against the camera unit in the active position, the flap being a part of a pivot mechanism for the pivoting of the camera unit,
the pivot mechanism having two pivot arms that are rotatably coupled to the camera unit at oppositely disposed sides of the camera unit and that pivot in opposite directions during the pivoting of the camera unit one of the two pivot arms being connected to the camera unit at an upper side of the camera unit in the active position, the other of the two pivot arms being connected to the camera unit at a lower side of the camera unit in the active position, wherein the upper side and the lower side of the camera unit each being on opposite sides of an optical axis of the camera.

14. The camera arrangement in accordance with claim 13, wherein the seal has a first active surface and a second active surface, with the flap contacting the first active surface in the position of rest and with the camera unit contacting the second active surface in the active position.

15. The camera arrangement in accordance with claim 13, wherein the seal forms an abutment against which the camera unit abuts in the active position.

16. The camera arrangement in accordance with claim 13, wherein the flap is pivotably coupled to a housing forming the opening and defining the chamber.

17. The camera arrangement in accordance with claim 13, wherein the flap is rotatably connected to the camera unit.

18. The camera arrangement in accordance with claim 8, wherein one of the pivot arms presses the cover open into an open position on the pivoting into the active position against a restoring force of a return spring acting on the cover.

19. The camera arrangement in accordance with claim 10, wherein a pivot arm pressing a cover open is formed as the flap.

20. The camera arrangement in accordance with claim 12, wherein the seal has a first active surface and a second active surface, with the flap contacting the first active surface in the position of rest and with the camera unit contacting the second active surface in the active position.

21. The camera arrangement in accordance with claim 12, wherein the seal forms an abutment against which the camera unit abuts in the active position.

22. The camera arrangement in accordance with claim 10, wherein the flap is pivotably coupled to a housing forming the opening and defining the chamber.

23. The camera arrangement in accordance with claim 10, wherein the flap is rotatably connected to the camera unit.

* * * * *